Patented Sept. 23, 1952

2,611,702

UNITED STATES PATENT OFFICE 2,611,702

PROCESS FOR THE PRODUCTION OF ADJUNCT TO FEEDSTUFFS

Leo Potishman, Fort Worth, Tex.

No Drawing. Application January 27, 1951, Serial No. 208,239

7 Claims. (Cl. 99—6)

This invention relates to the art of preparing feedstuffs for livestock to afford a well balanced product containing elements of mineral matter and vitamins beneficial to the well being of the animals, and its principal object resides in the provision of a food supplement by which a correct proportionment of the necessary elements can be administered without hazarding the possibility of deviating from a prescribed formula, and under such circumstances the mineral matter and vitamins can be fed in separate doses with the assurance of the proper administration of a uniform product.

The quantity of the elements and their combination has considerable bearing upon the results attained, and when processed in quantities, ready for dispensing by the livestock feeder, the manufacturer can be certain that the potency of vitamins is correct, provided certain conditions are maintained which will protect the products from adverse effects of oxidation, presence of high acid or alkalinity, heat or ingredients having a tendency to deteriorate, resulting in the destruction of vitamins.

A further object of the invention resides in the provision of a food supplement, or food "adjunct," for livestock containing vitamins, mineral matter, absorbent and hygroscopic products in liquid form, compounded in such a manner that it inhibits the vitamins from oxidation and results in a dry, granular, homogeneous material. Thus, the aim of the invention is to provide a suitable adjunct to ordinary feedstuffs whereby to prevent the deficiency in vitamins and mineral matter available to the animal.

In the preparation of vitamins, it is a well known practice to disperse them and incorporate them in a protective coating such as gelatin, wax, carbohydrate products, such as molasses or invert sugar. I have found that the vitamins are not protected against deterioration when mixed with such protective coating, especially when vitamins in oil are present. To have a stable product, according to my process, the oily or liquid vitamins are absorbed first in a dry feedstuff which, in a true sense, is not a filler but contributes to the vitamin content of the product. After the assimilation of the fluid vitamins in the absorbent, it is mixed with an additional quantity of solid crystalline or amorphous vitamins and then protected with a hygroscopic liquid which is taken up by the absorbent, thus making it impervious to ordinary deteriorating influences.

A further aim of my process is to produce a homogeneous mixture, consisting of vitamins and mineral matter, in such a manner that the mineral matter will not have an adverse effect upon the vitamins. I have found that the coating of the mineral matter and vitamins separately is not sufficient to effect the stability of the vitamins. The hydrogen ion concentration, temperature and quantity of alkali compounds have a great influence upon the stability of vitamins.

In the prior art, we find that the pH should be low, expecting to inhibit the vitamins from oxidation. This does not hold true when a mixture of vitamins is present and reaction which will take place between the protective coating as applied to the mixture and mineral matter. For example, the use of molasses is considered merely from its sugar content only. This hygroscopic liquid in reality contains up to 40 per cent of the solid content as non-sugars and usually has a pH below 6. The organic non-sugars are mostly combined with inorganic compounds and therefore the addition of phosphates or carbonates are apt to change owing to the double decomposition which will take place in the presence of water.

For this reason I have found that when using molasses, a pH 6 to 7 produces the greatest stability, and in order to maintain it, I incorporate in my product an alkali carbonate or bicarbonate which combines easily with organic non-sugars and free acid, and the alkali compounds will be predominantly present in the molasses ash or in the hygroscopic liquid.

While I have specified the use of molasses, I have found that good results can be obtained from the use of citrus waste liquor which is high in acid, such as citric acid. The free acid is partially neutralized preferably with an alkaline earth compound, such as calcium carbonate or hydrate, and then an additional amount of alkali compound is added for stabilization purposes. Other coating materials can be used also, as for example, distillers' solubles either from grain or molasses distilleries, which are practically free of carbohydrates.

While I may use gelatin or other coatings, the price is generally prohibitive and the results obtained with the products enumerated above provide a more stable product than the more expensive coatings used commercially. Another advantage these coatings possess is that of containing vitamins which reduce the cost of the product, while affording substantially the same quality.

*Example*

Vitamins A and D are mixed first with an absorbent, such as finely ground alfalfa meal in a sufficient quantity that the vitamins are all absorbed, that will yield a dry product. Then, additional quantities of vitamins are added in dry form and coated with a sufficient quantity of molasses, or equivalent product, whereby a granular, homogeneous product is obtained.

The mineral matter may contain any well known ingredients, such as calcium carbonate, calcium phosphates, iron oxide, manganese oxide, etc., or compounds which are essential in the feeding of livestock. These compounds, after being mixed, are coated with any of the hygroscopic liquids enumerated. However, to this liquid is added sufficient alkali carbonate or bicarbonate to raise the pH to 6 but not above 7, which ratio is found to be most desirable since the high pH prevents the chemical action upon the vitamins or mineral matter. Therefore, by mixing these products after the incorporation of the alkali carbonate, a stable adjunct or supplementary feedstuff is obtained.

Another advantage of the high pH is that, by preventing chemical reactions to take place, no heat of reaction will occur causing so called local over-heating. Consequently, the protective coating will inhibit the vitamins from oxidation and destruction, thus after mixing the vitamins and mineral matter, coated with sufficient hygroscopic liquid, a uniform, granular, dry product is obtained without the application of heat.

Manifestly, in the preparation of my product, certain modifications and substitutions may be resorted to from time to time, by persons skilled in the art, without departing from the spirit and intent of my invention or the scope of the appended claims.

What I claim is:

1. A process for the production of an adjunct to feedstuffs containing vitamins and mineral matter, which consists of mixing vitamins with a natural feed product having a high absorptive property for the absorption of vitamins, mixing the resulting compound with an additional amount of solid vitamins and mineral matter, coating the mixture rapidly with molasses to act as a binder having a pH 6 to 7 to produce a compound of agglomerated particles.

2. In a process for producing a dry digestible adjunct to feedstuffs, which consists of a compound of mineral matter and vitamins protected with a coating of concentrated citrus waste liquor containing organic acid and neutralized with sufficient alkaline earth carbonate to have a pH 6 to 7, and then forming a granular product which, upon standing, will not undergo spontaneous overheating.

3. A process for the production of an adjunct to feedstuffs for livestock which comprises mixing vitamins with a natural feed product having a high absorptive capacity for liquid vitamins, producing a finely dispersed product, and then incorporating rapidly therewith a hygroscopic coating liquid of the group consisting of molasses, waste citrus liquor, and grain and molasses distiller's solubles adjusted to a pH of 6–7, thereby inhibiting the loss of vitamins by oxidation.

4. A process as defined in claim 3 wherein mineral matter is coated with the said hygroscopic liquid and mixed with the said coated vitamin-containing composition.

5. A process as defined in claim 3 wherein the hygroscopic coating liquid is molasses.

6. A dry digestible adjunct to feedstuffs comprising a balanced mixture of vitamins and minerals, the vitamins being absorbed on a natural feedstuff, in the form of a dry granular product protected from oxidation by a coating of a hygroscopic liquid of the group consisting of molasses, citrus waste liquor, and grain and molasses distiller's solubles having a pH of 6–7.

7. An adjunct to feedstuffs as defined in claim 6 wherein the coating is molasses.

LEO POTISHMAN.

REFERENCES CITED

The following references are of record in the file of this patent:

UNITED STATES PATENTS

| Number | Name | Date |
|---|---|---|
| 2,079,340 | Smith | May 4, 1937 |
| 2,236,844 | Cocke | Apr. 1, 1941 |
| 2,375,278 | Buxton | May 8, 1945 |
| 2,430,797 | Zenzes | Nov. 11, 1947 |
| 2,512,537 | Zellers | June 20, 1950 |